United States Patent

[11] 3,540,336

[72] Inventor Christopher G. Kelsey
  Glenalta, Australia
[21] Appl. No. 580,276
[22] Filed Sept. 19, 1966
[45] Patented Nov. 17, 1970
[73] Assignee Data Resolved Tools Pty. Ltd.
  Plympton, South Australia, Australia
[32] Priority Nov. 19, 1965
[33] Australia
[31] 66,815

[54] PATTERN MAKING MACHINE
  11 Claims, 6 Drawing Figs.
[52] U.S. Cl................................................ 83/171,
  83/565
[51] Int. Cl...................................................... B26d 7/10

[50] Field of Search............................................83/171, 565

[56] References Cited
UNITED STATES PATENTS
2,177,087 10/1939 Akerlind ...................... 83/565X
3,402,232 9/1968 De Rusha .................... 83/565X Primary Examiner—James M. Meister
Attorney—Seed, Berry and Dowrey ABSTRACT: A pattern making machine for making patterns from plastic material. A distance multiplier is journaled on a post with a follower head on one end of the multiplier and a cutter head on the other end. The cutter head has arms defining a bowlike member and a heating wire extending between the arms.

CHRISTOPHER G. KELSEY
INVENTOR.

Sood & Berry
ATTORNEYS

CHRISTOPHER G. KELSEY
INVENTOR.

ATTORNEYS

PATTERN MAKING MACHINE

This invention relates to a pattern making machine suitable for making patterns from thermoplastic material, for example foam polystyrene.

Wooden patterns are commonly used but are of great cost and have been partly replaced by patterns of foam polystyrene (or other resin based foam plastics material) which will vaporize when invaded by a flow of molten metal. However the foam polystyrene patterns which are made still require a large amount of handwork and it is the main object of this invention to provide a machine and a process which will reduce the handwork required.

The machine, according to this invention may be said to consist of a pattern making machine having a post, a distance multiplier journaled on the post and having two portions extending in opposite directions therefrom, a follower head on the swinging end of one portion and a cutter head on the swinging end of the other portion, the cutter head having arms thereon defining a bowlike member, a heating wire extending between the arms and across the mouth of the bowlike member, and electrical conductors connected to the heating wire forming therewith an electrically conductive path. The process may be said to consist of making patterns from foam resin based plastics material which includes following a series of datum lines one at a time with the follower head of a pattern making machine while simultaneously applying a potential difference across the heating wire thereby heating the wire, passing the heating wire through a corresponding series of slabs of foam resin based material one at a time thereby cutting from the slabs a series of laminae each with an edge contour of similar shape but greater dimension than its respective datum line, cementing the laminae together in a face-to-face relationship, and fairing the edge contours in a direction normal to the cemented faces.

It is found that the machine of this invention, although simple in construction, can cut styrene slabs with good accuracy and at high speed. The process is found to be many times quicker than existing processes, and the edge contours is a simple hand process.

Embodiments of the invention are described hereunder in some detail, with reference to and are illustrated in the accompanying drawings, in which.

Figure 1:
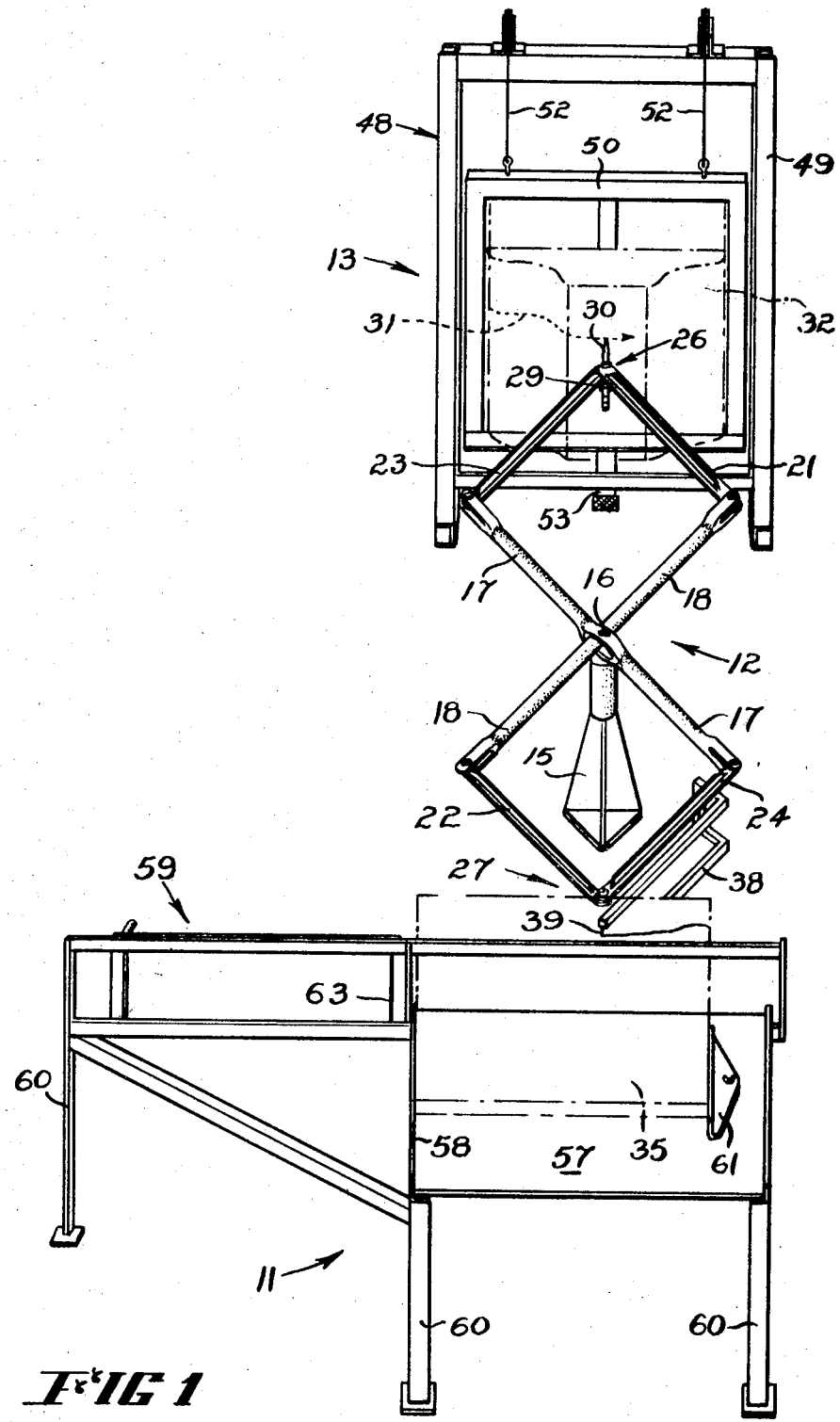
FIG. 1 is a perspective view illustrating a machine according to this invention wherein the follower head is arranged to follow horizontal datum lines on a model.
Figure 2:
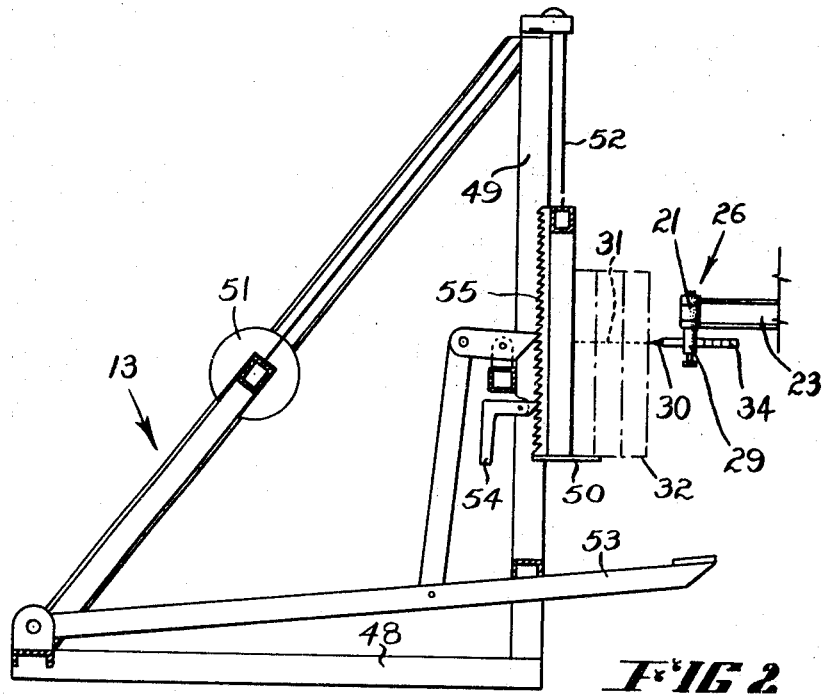
FIG. 2 shows a side elevation of the model support means.
Figure 3:
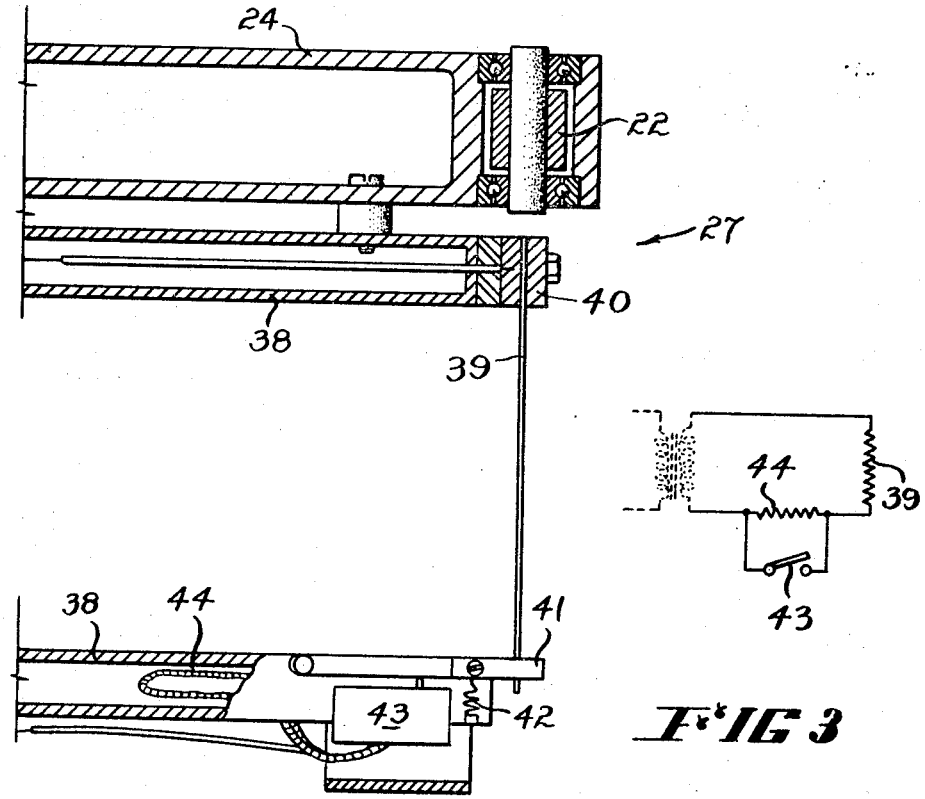
FIG. 3 is a section to an enlarged scale of the cutter head, showing also the electrical circuit employed.
Figure 4:
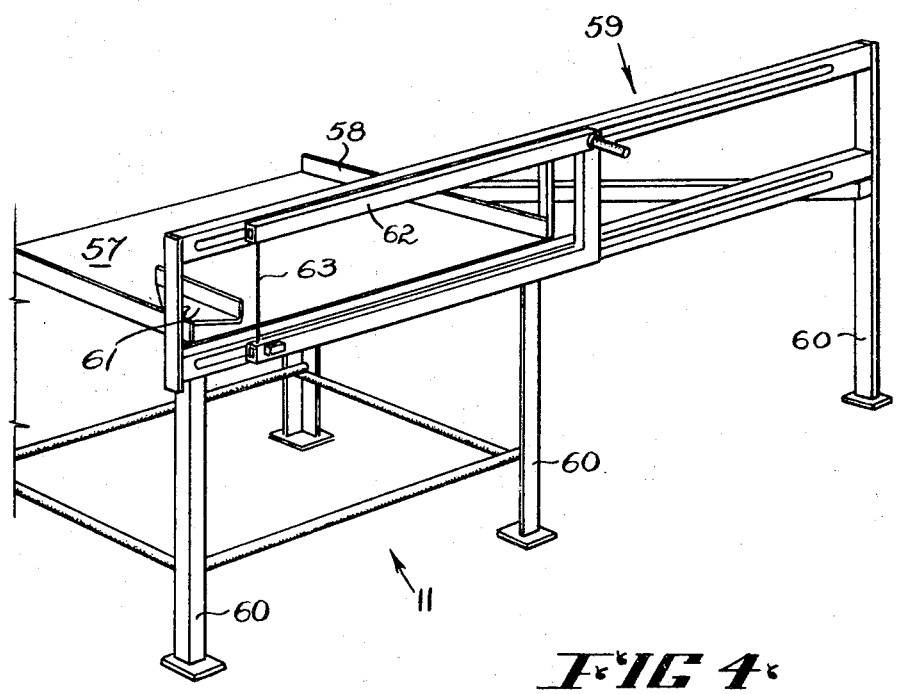
FIG. 4 is a perspective view of the foam slab support means.

Referring first to the embodiments of FIGS. 1, 2, 3 and 4, a pattern making machine (designated generally as 10) consists of three main units, namely a polystyrene foam support table 11, a follower and cutter 12 and a model mounting device 13.

The follower and cutter 12 is provided with a base 15 which has upstanding therefrom a post 16. Two arms 17 and 18 are separately journaled to the post 16 and intersect on its axis, and the swinging ends of these arms are coupled to and articulate with links 21, 22 and 23, 24 respectively, the other ends of the links 21 and 23 being articulated to one another and carrying a follower head 26. Corresponding ends of the links 22 and 24 carry a cutter head 27 (See FIG. 3), thus the arms and links constitute a double pantograph arrangement, but the lengths of the members on the cutter head end are longer than those on the follower end (by an amount which is proportional to a casting shrinkage allowance) and therefore the arms and links constitute a distance multiplier.

The follower head 26 (FIGS. 1 and 2) consists of a boss or block 29 which is secured to the link 23 (which is opposite to and corresponds with link 24), and this slidably supports a pointer 30 arranged to follow a datum line 31 on a model 32. Since it is sometimes necessary to make a machining allowance, the pointer 30 is slidable in the boss 29, and is provided with a series of graduation marks 34. If the pointer 30 moves outwardly in the boss 29, the cutter head 27 moves inwardly towards the post 16 by a similar amount thereby increasing the size of the styrene foam slab 35 being cut. While the accuracy of contour is adversely affected by this, it is a matter of little practical consequence since the inaccurate portion is cut away in machining.

The link 24 has secured to it a bowlike member 38 forming portion of the cutter head 27; the bowlike member 38 has a heating wire 39 stretched across its mouth. The heating wire 39 is a nickel chromium wire of about 0.030-inches diameter so that when heated it resists oxidation. It is clamped at its upper end by an upper clamp 40 secured to but insulated from the upper arm of the bow 38, while the lower clamp 41 is hinged to the lower arm of the bow 38. A spring 42 reacts between the lower clamp 41 and the lower arm of the bow 38 to apply tension to the wire 39. It also draws the clamp 41 against the operative portion of a microswitch 43. This microswitch 43 is across a resistance 44 constituted by an insulated wire carried within the lower arm of the bowlike member 38. As shown in the wiring diagram of FIG. 3, the heating wire 39 will reach a higher temperature when the switch 43 closes, since this will shunt the resistance 44, and this is effected in practice by deflection of the heating wire 39, for example as it is urged through the slab 35 of polystyrene foam. In the event of a "dwell" or slow speed of operation however, the wire 39 will be straightened by the spring 42, the contacts 43 again open, and the wire 39 will partly cool owing to the reduced current flow therethrough.

The model mounting device 13 (FIG. 2) consists of a frame 48 provided with vertical guides 49 which guide a support member 50 for vertical movement. The support member 50 is counterbalanced by weights 51 linked thereto with cables 52. Raising and lowering of the support member 50 is effected by the foot pedal 53 and release latch 54 which engage ratchet teeth 55 on the rear of the support member 50. The space between the teeth is that proportion of a "module" (in this embodiment 2½ inches) represented by the distance multiplier of the follower and cutter. Thus, if a pattern is composed of a stack of slabs each 2½ inches thick, its overall height should be the same proportion of overall height of the model as its other dimensions. Thus by simply depressing the foot pedal 53 the pointer 30 will follow a new datum line spaced the correct distance from the datum line 31 to correspond to one thickness of polystyrene slab.

The table 11 (FIG. 4) is provided with a planar sheet 57 with an upstanding side edge member 58 and an outrigger 59, all supported on legs 60. An adjustable guide 61 is secured to the planar sheet 57 and arranged to clamp the foam polystyrene slab 35 against the edge member 58. The outrigger 59 guides for movement a bowlike member 62 which carries a heating wire 63 across its mouth, and functions in the same way as the cutter head 27. When an edge profile has been cut in the polystyrene foam, the bow member 62 is moved across to cut off the required slab portion which then constitutes a lamina of the final pattern.

Figure 5:
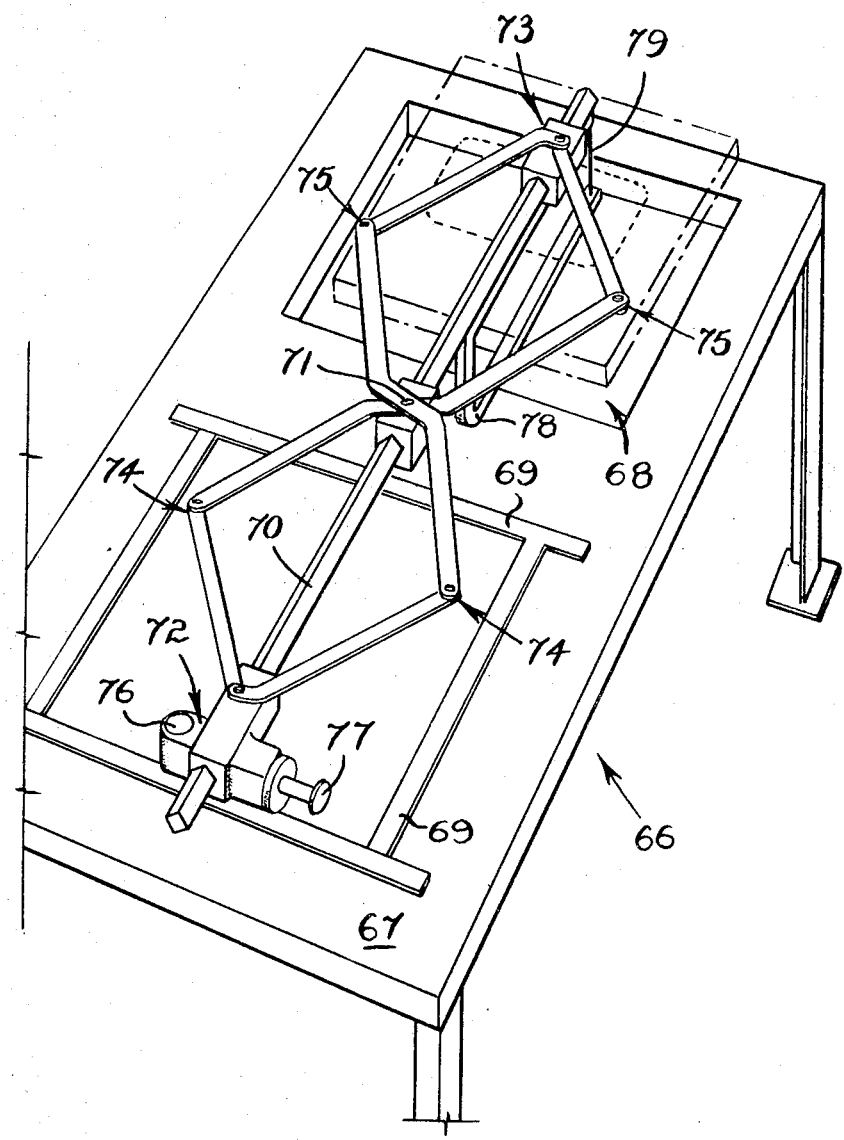
FIG. 5 is a perspective view according to a second embodiment wherein the follower head is arranged to follow datum lines on a drawing.

According to the embodiment of FIG. 5 a pattern making machine 66 comprises a table 67 which has an opening 68 near one end and has adjustable outer periphery rails 69 near the other end. An arm 70 is rotatable on an upstanding post 71 centrally of the table 67 and this arm supports at the rail end of the table a follower head 72 and at the opening end of the table a cutting head 73. Each head is carried on ball bearings to be freely movable along the arm 70 towards or away from the post.

A pair of articular links 79 connects the follower head 72 with the arm to be rotatable about the axis of rotation of the arm, the articular links extending rearwardly towards the opening and being extended by proportionately larger links 75 on the other side of the post, the larger links 75 being pivoted to the cutting head 73. In this way the follower head is at the apex of two identical similar triangles. This then provides a distance multiplying device similar to that of the first embodiment to take into account shrinkage in casting.

In this second embodiment the follower head 72 is provided on one side with a microscope 76 and on the other side with a rheostat 77, and the cutting head in this embodiment is provided with a bowlike member 78 and heating wire 79 as before. The wire receives a heating current through the rheostat 77, and also if desired through a switch which can be switched off in the case of any dwell, arranged as described above.

The process according to this embodiment consists in the steps of firstly marking off the drawing in contour lines at regular depth intervals, if this is applicable. The depth intervals can conveniently be 2½ inches if polystyrene is to be used since this is a standard module for most drawings of the contour type. The slab thickness would then be greater than 2½ inches by the contraction allowance. The drawing is then positioned beneath the microscope and the periphery rails are positioned over the drawing to define the outer shape of a pattern part to be cut, if this is applicable.

A polystyrene slab is clamped to the table and projects over the opening, and either the heating wire is fed into location or alternatively is positioned through a hole pierced in the polystyrene, the wire being heated by the passage of electric current. The appropriate contour is then cut out by simply moving the microscope over the contour line of the drawing, and the contour will be appropriately increased in size by the contraction allowance. After this has been completed the periphery cut of the polystyrene is made and this forms a regular datum which is made use of when the laminae of styrene are then cemented together. The foam styrene laminae are then simply faired (trimmed) by hand in a direction normal to their cemented faces, to the final shape.

Figure 6:
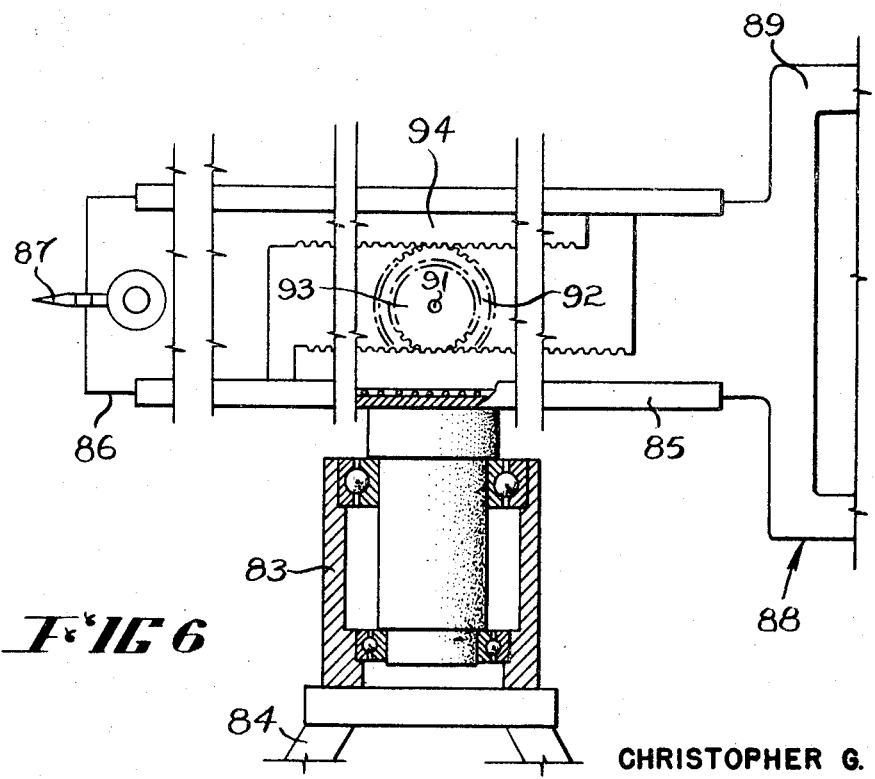
FIG. 6 is a partly sectioned elevation (to an enlarged scale) showing an alternative type of distance multiplier.

FIG. 6 illustrates, in a third embodiment, an alternative distance multiplier. A post 83 on a stand 84 has journaled to it a support track 85 extending in both directions. In one direction the support track 85 supports a slidable follower head 86 carrying a pointer 87 while in the other direction it supports a slidable cutter head 88 having on it a bowlike member 89. This is arranged with a heating wire (not shown) as in the other embodiments. A central pin 91 has journaled to it a double pinion having a larger portion 92 and a smaller portion 93. The larger portion 92 meshes with a rack 94 carried by the follower head 86 and the smaller portion 93 meshes with a rack 95 carried by the cutter head 88, the ratio of pinion diameters being the casting shrinkage ratio.

I claim:

1. A pattern making machine having a post, a distance multiplier journaled on the post and having two portions extending in opposite directions therefrom, a follower head on the swinging end of one portion and a cutter head on the swinging end of the other portion, the cutter head having arms thereon defining a bowlike member, a heating wire extending between the arms and across the mouth of the bowlike member, and electrical conductors connected to the heating wire forming therewith an electrically conductive path.

2. A pattern making machine according to claim 1 wherein the distance multiplier is constituted by two pairs of articular links independently journaled on the post and pivoted together at respective swinging ends.

3. A pattern making machine according to claim 1 wherein the distance multiplier is constituted by a double pinion having two pinion portions of differing diameters, the pinion portions meshing with respective racks coupled to a cutter head and follower head.

4. A pattern making machine having a post, a distance multiplier journaled on the post and having two portions extending in opposite directions therefrom, a follower head on the swinging end of one portion and a cutter head on the swinging end of the other portion, the cutter head having arms thereon defining a bowlike member, insulating means secured to one arm of the bowlike member and a hinge member hinged on the other arm, a heating wire extending across the mouth of the bowlike member and being secured at its ends to the insulating means and the hinge member, a switch secured relative to the second said arm of the bowlike member operatively engaged by the hinge member, spring means reacting between the hinge member and the second said arm of the bowlike member applying tension to the heating wire, and an additional resistance wire connected across the terminals of the switch which are open when the heating wire is straight and hot but which close when the hinge member moves due to deflection of the heating wire, thereby short circuiting the additional resistance wire and in turn increasing current flow through the heating wire.

5. A pattern making machine according to claim 4 wherein the follower head comprises a pointer member projecting outwardly from the distance multiplier.

6. A pattern making machine according to claim 4 wherein the follower head includes a microscope directed downwardly.

7. A pattern making machine having a post, a distance multiplier journaled on the post and having two portions extending in opposite directions therefrom, a follower head on the swinging end of one portion and a cutter head on the swinging end of the other portion, the cutter head having arms thereon defining a bowlike member, a heating wire extending between the arms and across the mouth of the bowlike member, electrical conductors connected to the heating wire forming therewith an electrically conductive path, a model mounting device having a frame, a support member guided for vertical movement along the frame, and adjustment means to adjust the head of the support member relative to the frame in equal increments, the follower head being movable over model means when retained by the support member to effect movement of the heating wire along a path of similar shape but greater dimension.

8. A pattern making machine according to claim 7 wherein the adjustment means are constituted by a ratchet member secured to the support member and engaged by a lifting pawl and a release latch pawl.

9. A pattern making machine according to claim 7 further comprising cables, pulleys journaled to the frame, and counterbalance means, the cables passing over respective pulleys and being connected to the support member at one end and the counterbalance means at the other end.

10. A pattern making machine according to claim 7 further comprising a table, securing means on the table arranged to secure a slab of foam resin based plastics material relative to the table, the slab when so secured having portion thereof in said path of the heating wire, guide means secured relative to the table, and cutoff means guided by the guide means arranged to guide the said slab when secured relative to the table.

11. A pattern making machine according to claim 7 further comprising a table, securing means on the table arranged to secure a slab of foam resin based plastics material relative to the table, the slab when so secured having portion thereof in said path of the heating wire, guide means secured relative to the table, cutoff means guided by the guide means arranged to guide the said slab when secured relative to the table, the cutoff means being constituted by a further bowlike member, a further heating wire extending between the arms and across the mouth of the further bowlike member, and further electrical conductors connected to the heating wire forming therewith an electrically conductive path.